US012602013B2

(12) United States Patent
Dinardi

(10) Patent No.: US 12,602,013 B2
(45) Date of Patent: Apr. 14, 2026

(54) PICKLEBALL SCORE WRISTWATCH DEVICE

(71) Applicant: Peter Dinardi, Pleasantville, NY (US)

(72) Inventor: Peter Dinardi, Pleasantville, NY (US)

( * ) Notice: Subject to any disclaimer, the term of this patent is extended or adjusted under 35 U.S.C. 154(b) by 274 days.

(21) Appl. No.: 18/401,750

(22) Filed: Jan. 2, 2024

(65) Prior Publication Data

US 2025/0130531 A1 Apr. 24, 2025

Related U.S. Application Data

(60) Provisional application No. 63/591,615, filed on Oct. 19, 2023.

(51) Int. Cl.

| | |
|---|---|
| ***G04B 47/00*** | (2006.01) |
| ***A63B 71/06*** | (2006.01) |
| ***G04G 9/00*** | (2006.01) |
| ***G04G 21/08*** | (2010.01) |

(52) U.S. Cl.

CPC .......... *G04B 47/00* (2013.01); *A63B 71/0669* (2013.01); *G04G 9/007* (2013.01); *G04G 21/08* (2013.01); *A63B 2071/0663* (2013.01)

(58) Field of Classification Search

CPC .... A63B 71/0669; G04B 47/00; G04G 9/007; G04G 21/08; G04G 9/00; G04G 21/00; G04G 21/025

See application file for complete search history.

(56) References Cited

U.S. PATENT DOCUMENTS

| | | | | |
|---|---|---|---|---|
| 4,331,098 A | | 5/1982 | Rubano | |
| 5,134,565 A | * | 7/1992 | Herbertz | G04G 9/0064 273/DIG. 26 |
| 6,012,995 A | * | 1/2000 | Martin | A63B 71/0669 377/5 |
| 6,634,548 B1 | * | 10/2003 | Bowman | A63B 71/06 235/1 B |
| 7,773,461 B1 | | 8/2010 | Crosby, Sr. | |
| 10,159,889 B2 | | 12/2018 | Johnson | |
| 11,400,358 B1 | | 8/2022 | McKay | |
| 2007/0032893 A1 | * | 2/2007 | Lowran | A63B 71/06 700/91 |

(Continued)

OTHER PUBLICATIONS https://play.google.com/store/apps/details?id=nl.stersoftware.pickleballscore&hl=en_US; 2025.*

(Continued)

*Primary Examiner* — Sean Kayes

(74) *Attorney, Agent, or Firm* — Brennan, Manna & Diamond, LLC

(57) ABSTRACT

A pickleball score wristwatch device is disclosed that helps pickleball players to keep score of their game, know whose serve it is, and the service side. The pickleball score wristwatch device comprises a body component that is configured in a rectangular shape that comprises a plurality of buttons for operation. Specifically, the buttons keep track of the score, change between server one and two in doubles play, reset the game, select singles or doubles match play, and power on and off the device. Further, the body component comprises an electronic face that depicts a pickleball court. And, an adjustable, rubberized wrist strap is secured to either end of the body component, to wrap around a user's wrist for comfort and security of the body component.

16 Claims, 4 Drawing Sheets

(56) References Cited

U.S. PATENT DOCUMENTS

| | | | | |
|---|---|---|---|---|
| 2007/0265120 | A1* | 11/2007 | Hickey | A63B 60/54 377/5 |
| 2011/0032086 | A1 | 2/2011 | Cabrera | |
| 2021/0113911 | A1 | 4/2021 | Madsen | |
| 2021/0354024 | A1* | 11/2021 | Goodwin | A63B 71/0622 |
| 2024/0245976 | A1* | 7/2024 | Cohen | G06F 3/1454 |

OTHER PUBLICATIONS https://www.facebook.com/groups/1340630926008388/posts/3178069772264485/; 2019.* https://web.archive.org/web/20201022232035/https://keysys.io/pickleball-referee-app/; 2020.*

* cited by examiner

PICKLEBALL SCORE WRISTWATCH DEVICE

CROSS-REFERENCE TO RELATED APPLICATION

The present application claims priority to, and the benefit of, U.S. Provisional Application No. 63/591,615, which was filed on Oct. 19, 2023, and is incorporated herein by reference in its entirety.

FIELD OF THE INVENTION

The present invention relates generally to the field of pickleball score wristwatch devices. More specifically, the present invention relates to an electronic wristwatch that keeps track of pickleball scores, serving sides, and servers. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in pickleball score wristwatch devices. Generally, pickleball players may lack the means to properly keep score of a game. Further, losing track of the score and who is serving can be frustrating. The serving team may not recall which of the two service areas to begin a serve. Accordingly, teams may forfeit serves and lose points for errors on serving requirements.

Further, the use of sports watches is known in the art, however, most sports watches track heart rate and calories burned, as well as steps taken. Typically, these sports watches do not keep score and/or determine which team is on service. However, it would be desirable to allow users to track their scores and to determine who is on service, so as not to lose points or forfeit serves unknowingly.

Accordingly, there is a demand for an improved pickleball score wristwatch device that keeps track of pickleball scores, serving sides, and servers. More particularly, there is a demand for a pickleball score wristwatch device that allows players to remain focused on their match and saves time and effort for the players.

Therefore, there exists a long-felt need in the art for a pickleball score wristwatch device that provides users with an electronic wristwatch that keeps track of pickleball scores, serving sides, and servers. There is also a long-felt need in the art for a pickleball score wristwatch device that features multiple buttons with functions like on and off, game resets server changes, scoring changes, scoring corrections, etc. Further, there is a long-felt need in the art for a pickleball score wristwatch device that allows players to remain focused on their match without trying to memorize all necessary aspects of scorekeeping and service. Moreover, there is a long-felt need in the art for a device that saves considerable time and effort for any pickleball player. Further, there is a long-felt need in the art for a pickleball score wristwatch device that includes an adjustable, rubberized wrist strap for comfort and security. Finally, there is a long-felt need in the art for a pickleball score wristwatch device that comprises a pickleball court as the face of the device.

The subject matter disclosed and claimed herein, in one embodiment thereof, comprises a pickleball score wristwatch device. The device is a wristwatch device that helps pickleball players to keep score of their game, know whose serve it is, and the service side. The pickleball score wristwatch device comprises a body component that is configured in a rectangular shape that comprises a plurality of buttons for operation. Specifically, there are two buttons on one side of the body component, with one button advancing the score in increments of one point and the second button reducing the score in increments of one point, if an error was made. On the face of the body component, two digital touch buttons would be positioned, for changing between server one and two in doubles play and the other button resets the game. Further, there are two buttons on the opposing side of the body component, with one button setting the game for singles or doubles matches, and the other is an on/off button for activating and deactivating the device and allowing the device to operate as a watch or scoring device. Further, the body component comprises an electronic face that depicts a colorized or black-and-white pickleball court. And, an adjustable, rubberized wrist strap is secured to either end of the body component, to wrap around a user's wrist for comfort and security of the body component.

In this manner, the pickleball score wristwatch device of the present invention accomplishes all of the foregoing objectives and provides users with a device that keeps track of pickleball scores, serving sides, and servers. The device is an electronic watch that displays a pickleball court. The device saves considerable time and effort for pickleball players.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a pickleball score wristwatch device. The device is a wristwatch device that helps pickleball players to keep score of their game, know whose serve it is, and the service side. The pickleball score wristwatch device comprises a body component that is configured in a rectangular shape that comprises a plurality of buttons for operation and function. Further, the body component comprises an electronic face that depicts a pickleball court. And, a wrist strap secured to either end of the body component, to wrap around a user's wrist for comfort and security of the body component.

In one embodiment, the pickleball score wristwatch device can be manufactured in a variety of configurations and shapes. The below embodiments describe the invention adapted for pickleball. In one embodiment, the device is a small or miniature device, which can be held by a player, be applied on a player's wrist or other part of the body, connected to an article of clothing of the player, etc. Each device has a processor and memory for support and executes various functions for tracking pickleball scores and serves and provides a user with visible information.

In one embodiment, the pickleball score wristwatch device provides a device that is worn by a user and provides scorekeeping and serving functions for pickleball. The pickleball score wristwatch device maintains scoring data associated with the set and with the match. Additional modes of the device permit monitoring of the time of day in hours and minutes as well as keeping score between two players or two teams of players in a pickleball game whose winner is determined by point accumulation. In scorekeeping mode, the device also allows for keeping track of serving sides and servers.

In one embodiment, the pickleball score wristwatch device comprises a body component and a wrist strap or band. The band extends between opposing ends of the body component, wherein the ends of the band respectively connect to the opposing ends of the body component via any suitable securing means as is known in the art. In another embodiment, the body component and band can be integrally-formed. "Integrally-formed" refers to the fact that in the exemplary embodiment, the body component and band can be formed together rather than being formed separately and then subsequently joined. Furthermore, the ends of the band are spaced from one another such that the body component and the band cooperate to form a loop operable to receive a body part of a user, such as an arm or wrist. The band is adjustable and typically made of a rubberized material to provide both flexibility and comfort to the user. Specifically, the band has an adjustable strap, such as a buckle, snap, velcro, toggle, etc.

In one embodiment, the body component of the device is configured in a rectangular configuration but can be any suitable shape and size as is known in the art, such as square, circular, or oval. Typically, the body component comprises a front surface, a bottom surface, opposing top and bottom ends, and opposing right and left sides. Further, the body component includes a display module with a display screen (positioned on the front surface) and a plurality of buttons. The display screen is operable to generate a display of a pickleball court and/or a score of the game. The buttons are operable to be engaged to change the display generated by the display screen, such that the pickleball court can be colorized or black and white. Further, the display module is operable to display scores in a plurality of different formats, depending on the needs and/or wants of a user.

In one embodiment, the body component comprises electric circuitry including one or more processors, memory, and input/output components. Other circuits of varying sizes and functionalities can be applied in other embodiments of the invention. Further, the body component can support the viewable display screen of the display module and a plurality of buttons. The display screen can generate high-resolution output. The exemplary display screen can be an LCD screen, but other display technologies can be used in alternative embodiments of the invention. The exemplary display screen can display alphanumeric images, as well as, graphic symbols and different colors. The memory of embodiments of the invention could be chosen to be large enough to also store data, such as medical data and personal contact information.

In one embodiment, on the left opposing side of the body component, there are at least two function buttons positioned, however, the buttons can be positioned on either side of the body component. The first button sets the game for singles or doubles matches. A push of the button sets the game for doubles play, and another push sets the game to singles play. If the incorrect play is set, a single push can move it back. The second button is the on/off button which activates and deactivates the device, as well as controls the modes of the device. Specifically, the on/off button allows the device to enter watch mode or scorekeeper mode, as desired.

In one embodiment, the on/off button is positioned on the left side of the body component but can be positioned on either side of the body component. The on/off button allows the user to direct the processor to vary the mode of operation of the device. For example, the processor can maintain the device in a "watch mode" as a default setting or default mode. In other words, the display screen can be controlled by the processor to display the time and/or date and/or other data when the device is not being used to keep score. Another mode of operation could be a timer or stopwatch mode. A further mode of operation would be scorekeeper mode.

In one embodiment, upon the user pressing the on/off button once, the device is powered on and enters watch mode to display the time. Pressing the on/off button twice, the processor controls the device to change the mode of operation and act in scorekeeper mode as a general scorekeeper. For example, the display screen can be controlled by the processor to display a pickleball court and the score "00" to "00." It is also noted that the display can be used for tracking servers and serving sides, as well. Holding the on/off button down for three seconds powers the device off. It is noted that the on/off button, as well as the other buttons, can be spring-loaded to return to respective extended positions after having been pressed by a user.

In one embodiment, when the device is in general scorekeeper mode, the two buttons on a right side of the body component operate to maintain the correct score in the pickleball game. However, the two buttons can also be located on either side of the body component. Typically, the top button can be pressed to advance the score in increments of one. The bottom button reduces the score in increments of one, in the event an error was made in entering the score. The processor can be programmed to interpret various button presses to accommodate other scoring possibilities including decreasing scores, new games wherein the displayed score reverts to "00-00," and reversion back to the default mode.

In one embodiment, when the device is in general scorekeeper mode, there are at least two buttons positioned on the display screen. These two buttons are digital touch buttons and allow the user additional functionalities. For example, the first button allows the user to change between server one and two, in doubles play. The server change button can be adjusted to both sides, and the scoring button can then add one point to the appropriate team. The second button allows a user to reset the game. The game reset button is pressed twice to start a new game. If the second team begins the game, the reset button is pressed a third time.

In one embodiment, the other buttons of the device control various functions, depending on what mode the device is in. For example, when the device is in watch mode, the reset button can be used to set and reset the correct hour of the day. Typically, the reset button is positioned on the face of the display screen. While the device is in watch mode, upon the user pressing and holding the exemplary reset button for three seconds, the hour digit(s) will blink, indicating that the hour can be changed. The reset button can then be pressed repeatedly, as desired, to advance the hour data up from the currently displayed hour to the desired hour. In this time-change mode, the reset button can also be pressed as desired to reduce the hour data from the currently displayed hour to the desired hour. In the exemplary embodiment, if the reset button is not pressed after five seconds, the time will be set and the device will continue to operate in watch mode.

In one embodiment, the exemplary band can be worn on the wrist of a user. It is noted that in alternative embodiments of the invention, the device can be worn on the leg or bicep.

An alternative embodiment could include a band that can be bifurcated and selectively connected together, like a two-piece watch band. Such an embodiment could be mounted on the back of a pickleball racket. The exemplary embodiment is water-resistant and some embodiments can be waterproof.

In one embodiment, the exemplary band is formed from silicone. Further, the material used to form the band can be infused with negative ion-emitting material to promote the health of the user. Pulverized minerals such as germanium, tourmaline, and/or Si Bin can be mixed in with the raw silicone material prior to molding to infuse the band with negative ion energy, or other suitable materials.

In one embodiment, the processor, the display screen, and other electrically-powered components of the device can be powered by a battery operable to supply direct current. Such a battery could be rechargeable. In alternative embodiments, a solar panel could be incorporated to provide power.

Embodiments of the invention can be practiced with display modules that can communicate through the display screen as well as another communication scheme. For example, embodiments of the invention can be operable to communicate through Bluetooth, Wi-Fi, and/or a cellular phone network. Embodiments of the invention may also incorporate a USB port for communication.

In other embodiments of the invention, the display module can also include circuitry, programming, a speaker, and any other necessary components to generate audible sounds. For example, the display module could be operable to operate in an alarm mode, such that the user could set an audible alarm to go off at a desired time. Such alarms could also be communicated to the user by vibration in other embodiments of the invention.

In other embodiments of the invention, the display module can also include circuitry, programming, and any other necessary components to function as a pedometer. Further, the display module can also include circuitry, programming, and any other necessary components to function as a heart rate monitor, a global positioning system, a thermostat, an accelerometer, an altimeter, a barometer, and/or a wireless car key, etc.

In one embodiment, the design of the invention is intended to minimize interference with various body and arm movements required by gameplay and to permit efficient and time-saving data entry to provide continuous score updating. While the embodiments depict a unified construction embodying the elements of a display screen and multiple data input initiator buttons, it could easily be separated into two or more of its elements wherein the invention may embody a separate display screen comprising multiple data input initiators, which may be attached to one or more strap elements for affixing to a player's wrist. Further, the band and body component could be formed separately and connected together in alternative embodiments of the invention. This feature would allow the band to be replaced for aesthetic reasons or normal wear and tear.

In yet another embodiment, the pickleball score wristwatch device comprises a plurality of indicia.

In yet another embodiment, a method of keeping track of scores, serving sides, and servers, in a pickleball game is disclosed. The method includes the steps of providing a pickleball score wristwatch device comprising a body component with a display screen and a plurality of buttons and a wrist strap. The method also comprises securing the wrist strap around a user's wrist for use. Further, the method comprises pushing the on/off button to activate the device. The method also comprises selecting between singles and doubles play. Finally, the method comprises utilizing the buttons to keep score, reset the game, and keep track of serving sides and servers as the game is played.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
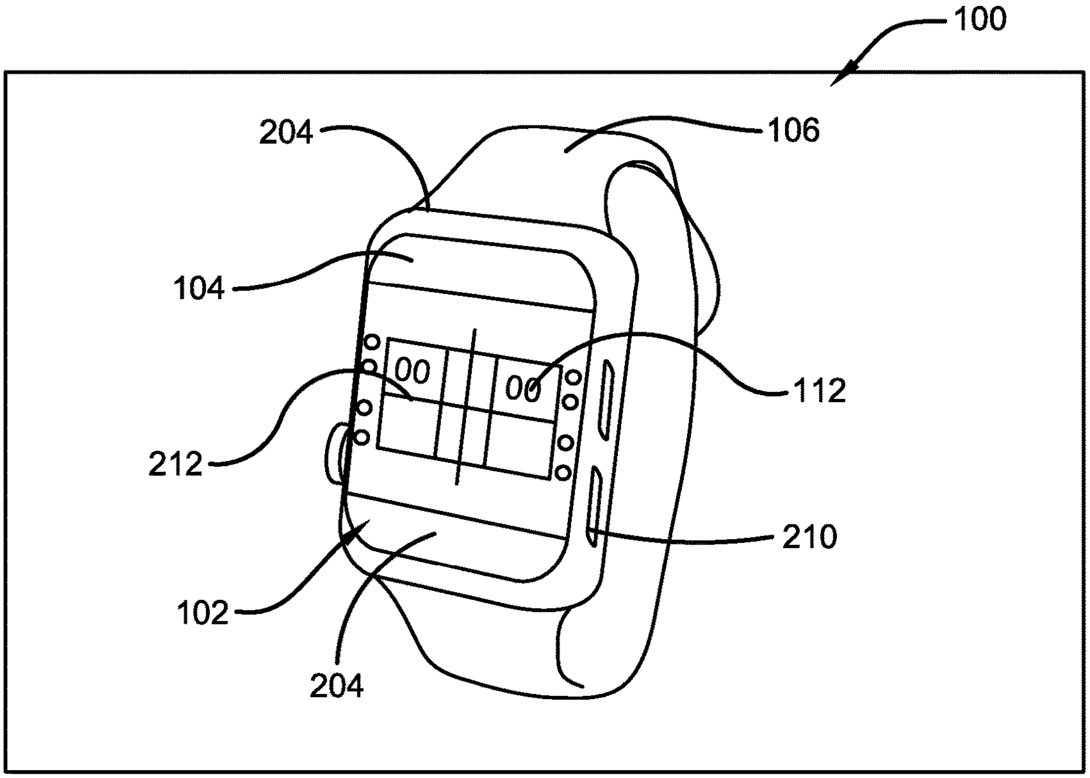
FIG. 1 illustrates a perspective view of one embodiment of the pickleball score wristwatch device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown.

Thus, in other embodiments, any of the features described herein from different embodiments may be combined.

As noted above, there is a long-felt need in the art for a pickleball score wristwatch device that provides users with an electronic wristwatch that keeps track of pickleball scores, serving sides, and servers. There is also a long-felt need in the art for a pickleball score wristwatch device that features multiple buttons with functions like on and off, game resets server changes, scoring changes, scoring corrections, etc. Further, there is a long-felt need in the art for a pickleball score wristwatch device that allows players to remain focused on their match without trying to memorize all necessary aspects of scorekeeping and service. Moreover, there is a long-felt need in the art for a device that saves considerable time and effort for any pickleball player. Further, there is a long-felt need in the art for a pickleball score wristwatch device that includes an adjustable, rubberized wrist strap for comfort and security. Finally, there is a long-felt need in the art for a pickleball score wristwatch device that comprises a pickleball court as the face of the device.

The present invention, in one exemplary embodiment, is a novel pickleball score wristwatch device. The device is a wristwatch device that helps pickleball players to keep score of their game, know whose serve it is, and the service side. The pickleball score wristwatch device comprises a body component that is configured in a rectangular shape that comprises a plurality of buttons for operation. Further, the body component comprises an electronic face that depicts a pickleball court. And, an adjustable, rubberized wrist strap is secured to either end of the body component, to wrap around a user's wrist for comfort and security of the body component. The present invention also includes a novel method of keeping track of scores, serving sides, and servers, in a pickleball game. The method includes the steps of providing a pickleball score wristwatch device comprising a body component with a display screen and a plurality of buttons and a wrist strap. The method also comprises securing the wrist strap around a user's wrist for use. Further, the method comprises pushing the on/off button to activate the device. The method also comprises selecting between singles and doubles play. Finally, the method comprises utilizing the buttons to keep score, reset the game, and keep track of serving sides and servers as the game is played.

Referring initially to the drawings, FIG. 1 illustrates a perspective view of one embodiment of the pickleball score wristwatch device 100 of the present invention. In the present embodiment, the pickleball score wristwatch device 100 is an improved pickleball score wristwatch device 100 that provides a user 110 with a wristwatch device that helps pickleball players keep track of scores, serving sides, and servers. Specifically, the pickleball score wristwatch device 100 comprises a body component 102 with a plurality of buttons 300-310 for operation of the device 100. Further, the body component 102 comprises a display screen 104 that depicts a score 112 and a wrist strap 106 that wraps around a user's wrist 108 for comfort and security.

Generally, the pickleball score wristwatch device 100 can be manufactured in a variety of configurations and shapes. The below embodiments describe the invention adapted for pickleball, but the device 100 could be adapted for other sports as well. In one embodiment, the device is a small or miniature device, which can be held by a player 110, be applied on a player's wrist 108 or other part of the body, connected to an article of clothing of the player 110, etc. Each device 100 has a processor and memory for support and executes various functions for tracking pickleball scores 112 and serves and provides a user 110 with visible and sometimes audio information.

Further, the pickleball score wristwatch device 100 provides a device 100 that is worn by a user 110 and provides scorekeeping and serving functions for a pickleball match. The pickleball score wristwatch device 100 maintains scoring data associated with the set and with the match. Additional modes of the device 100 permit monitoring of the time of day in hours and minutes as well as keeping score between two players or two teams of players in a pickleball match, whose winner is determined by point accumulation. In scorekeeping mode, the device 100 also allows for keeping track of serving sides and servers.

Figure 2:
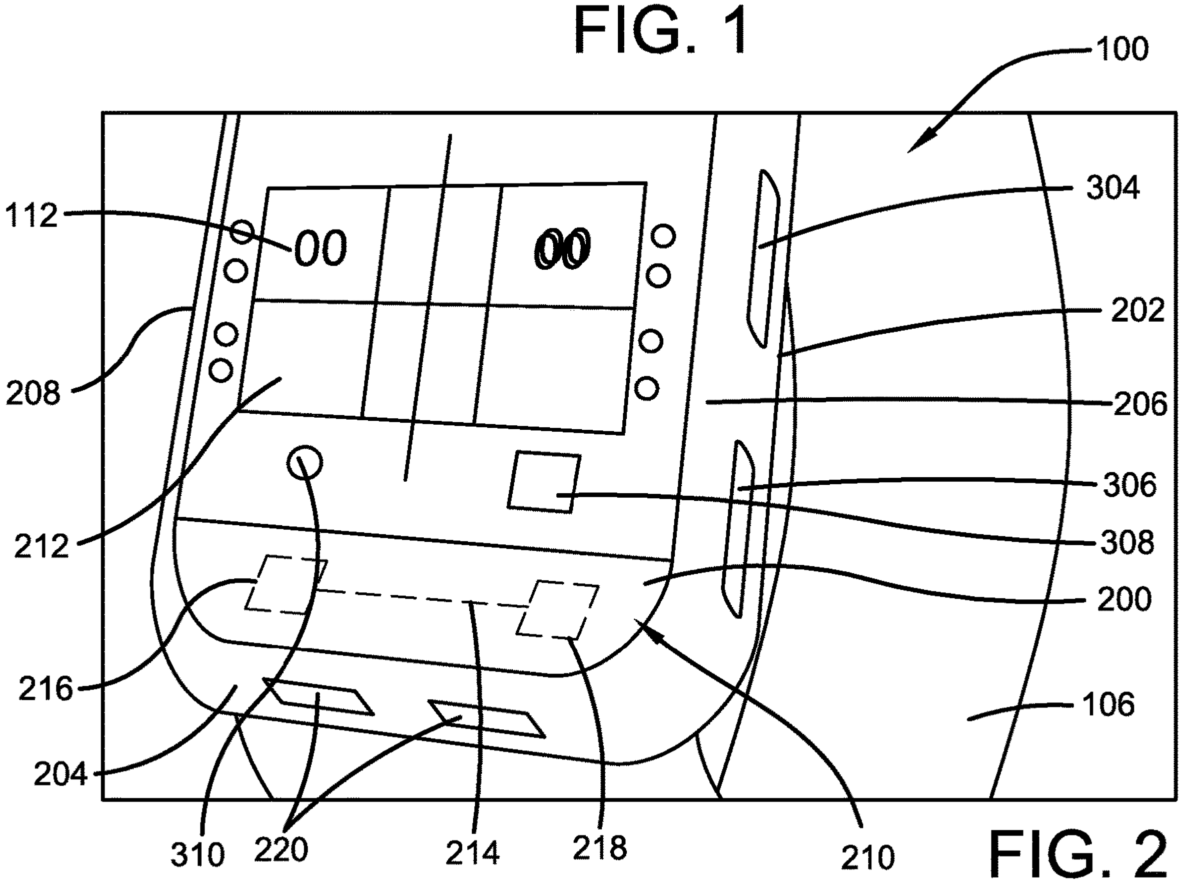
FIG. 2 illustrates a perspective view of one embodiment of the pickleball score wristwatch device of the present invention showing the display screen in accordance with the disclosed architecture.

As shown in FIG. 2, the body component 102 of the device 100 is configured in a rectangular configuration but can be any suitable shape and size as is known in the art, such as square, circular, or oval. Typically, the body component 102 comprises a front surface 200, a bottom surface 202, opposing top and bottom ends 204, and opposing right 206 and left 208 sides. Further, the body component 102 includes a display module 210 with a display screen 104 (positioned on the front surface 200) and a plurality of buttons 300-310. The display screen 104 is operable to generate a display of a pickleball court 212 and/or a score 112 of the game. The buttons 300-310 are operable to be engaged to change the display generated by the display screen 104, such that the pickleball court 212 can be colorized or black and white. Further, the display module 210 is operable to display scores 112 in a plurality of different formats, depending on the needs and/or wants of a user 110.

Figure 6:
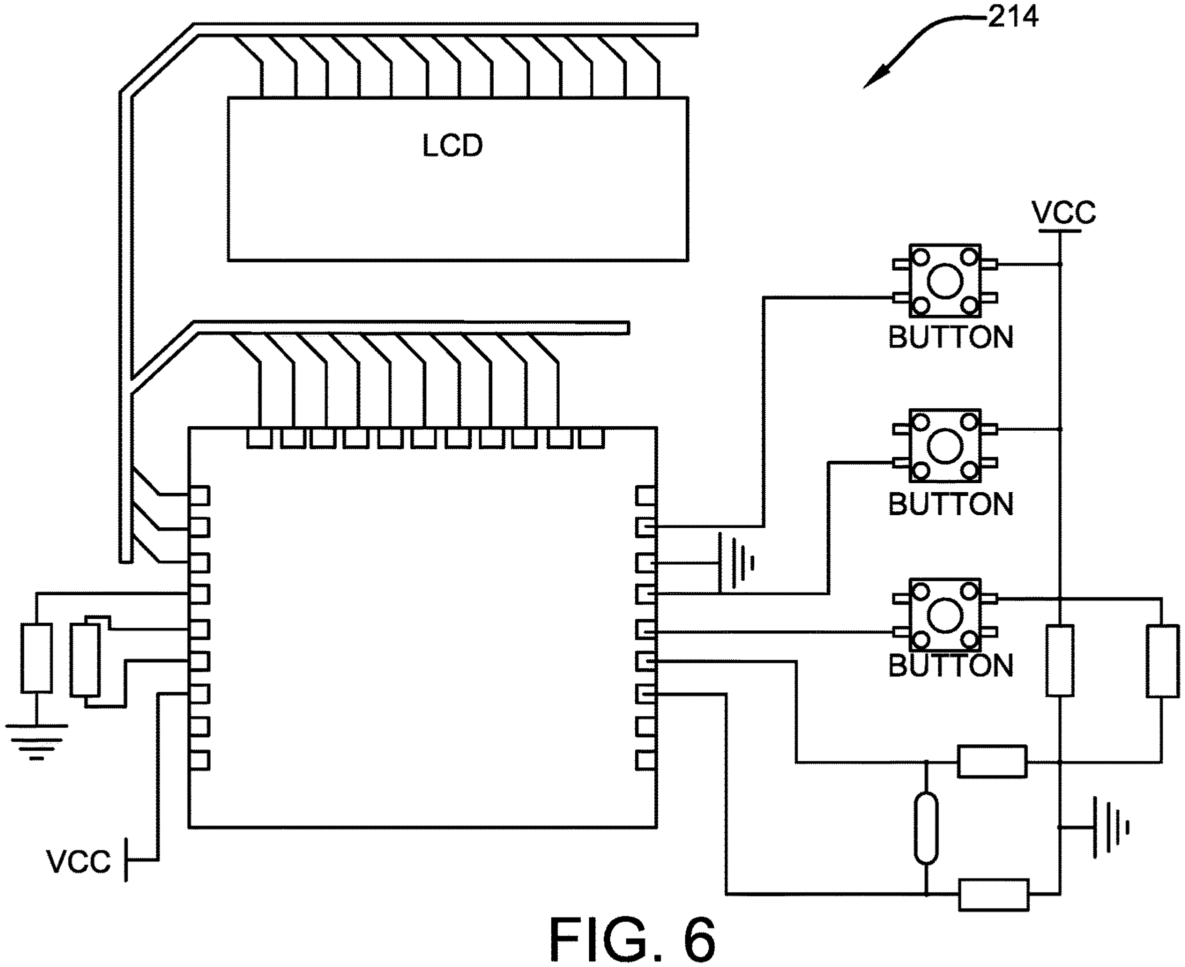
FIG. 6 is a schematic view of circuitry that can be applied in embodiments of the invention.

Furthermore, the body component 102 comprises electric circuitry 214 including one or more processors 216, memory 218, and input/output components 220. Specifically, FIG. 6 is a schematic view of circuitry 214 that can be applied in embodiments of the invention. Other circuits of varying sizes and functionalities can be applied in other embodiments of the invention. Further, the body component 102 can support the viewable display screen 104 of the display module 210 and a plurality of buttons 300-310. The display screen 104 can generate high-resolution output. The exemplary display screen 104 can be an LCD screen, but other display technologies can be used in alternative embodiments of the invention. The exemplary display screen 104 can display alphanumeric images, as well as, graphic symbols and different colors, etc. The memory 218 of embodiments of the invention could be chosen to be large enough to also store data, such as medical data and personal contact information, as needed.

Figure 3:
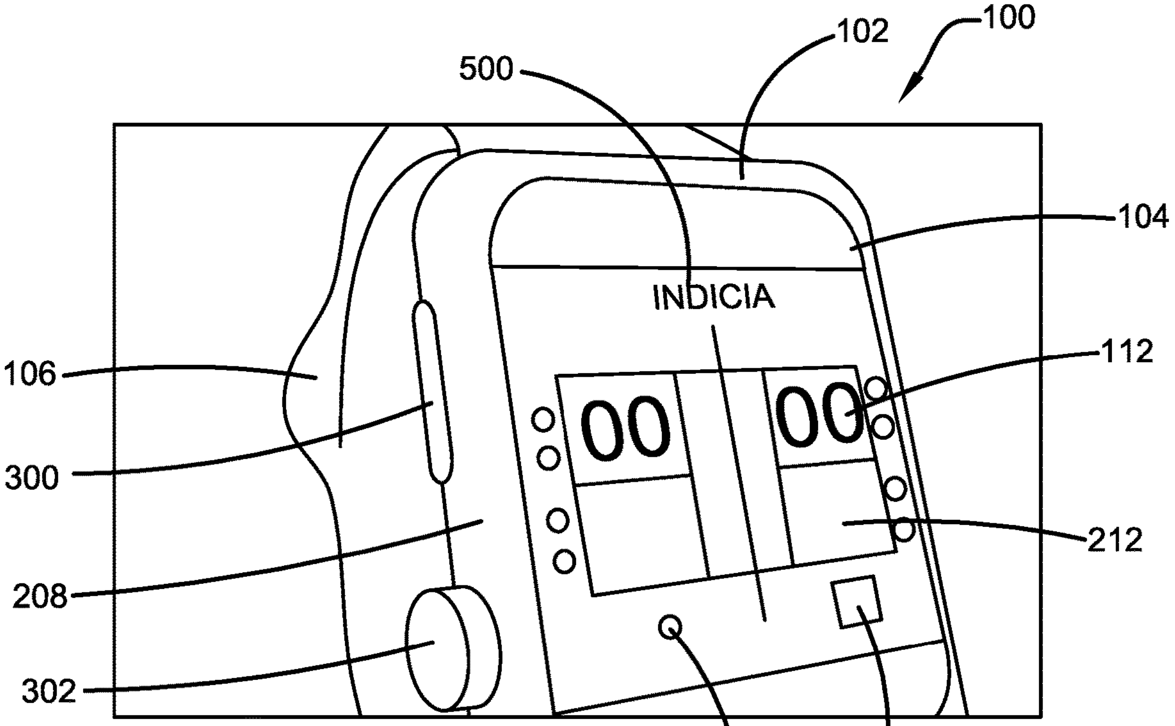
FIG. 3 illustrates a perspective view of one embodiment of the pickleball score wristwatch device of the present invention showing the device and its buttons in accordance with the disclosed architecture.

As shown in FIG. 3, on the left opposing side 208 the body component 102, there are at least two function buttons 300, 302 positioned, however the buttons 300, 302 can be positioned on either side 206 or 208 of the body component 102. The first button 300 sets the game for singles or doubles matches. A push of the button 300 sets the game for doubles play, and another push of the button 300 sets the game to singles play. If the incorrect play is set, a single push of the button 300 can move it back. The second button 302 is the on/off button 302 and activates and deactivates the device 100, as well as controls the modes of the device 100. Specifically, the on/off button 302 allows the device 100 to enter watch mode or scorekeeper mode, as desired.

Typically, the on/off button 302 is positioned on the left side 208 of the body component 102 but can be positioned on either side 206 or 208 of the body component 102. The on/off button 302 allows the user 110 to direct the processor 216 to vary the mode of operation of the device 100. For example, the processor 216 can maintain the device 100 in a "watch mode" as a default setting or default mode. In other words, the display screen 104 can be controlled by the processor 216 to display the time and/or date and/or other data when the device 100 is not being used to keep score. Another mode of operation could be a timer or stopwatch mode. A further mode of operation would be scorekeeper mode, for keeping track of pickleball scores 112, serving sides and servers in a pickleball match.

Furthermore, upon the user 110 pressing the on/off button 302 once, the device 100 is powered on and enters watch mode to display the time. Pressing the on/off button 302 twice, the processor 216 controls the device 100 to change the mode of operation and act in scorekeeper mode as a general scorekeeper for pickleball matches. For example, the display screen 104 can be controlled by the processor 216 to display a pickleball court 212 and the score 112 "00" to "00." It is also noted that the display 104 can be used for tracking servers and serving sides, as well. Holding the on/off button 302 down for three seconds powers the device 100 off. It is noted that the on/off button 302, as well as the other buttons, can be spring-loaded to return to respective extended positions after having been pressed by a user 110.

Additionally, when the device 100 is in general scorekeeper mode, the two buttons 304, 306 on a right side 206 of the body component 102 operate to maintain the correct score in the pickleball game. However, the two buttons 304, 306 can also be located on either side 206, 208 of the body component 102. Typically, the top button 304 can be pressed to advance the score 112 in increments of one. The bottom button 306 reduces the score 112 in increments of one, in the event an error was made in entering the score 112. The processor 216 can be programmed to interpret various button presses to accommodate other scoring possibilities including decreasing scores, new games wherein the displayed score reverts to "00-00," and reversion back to the default mode.

Further, when the device 100 is in general scorekeeper mode, there are at least two buttons 308, 310 positioned on the display screen 104. These two buttons 308, 310 are digital touch buttons and allow the user 110 additional functionalities. For example, the first button 308 allows the user 110 to change between server one and two, in doubles play. The server change button 308 can be adjusted to both sides, and the scoring button 304 can then add one point to the appropriate team. The second button 310 allows a user 110 to reset the game. The game reset button 310 is pressed twice to start a new game. If the second team begins the game, the reset button 310 is pressed a third time.

Additionally, the other buttons of the device 100 control various functions, depending on what mode the device 100 is in. For example, when the device 100 is in watch mode, the game reset button 310 can be used to set and reset the correct hour of the day. Typically, the game reset button 310 is positioned on the face of the display screen 104. While the device 100 is in watch mode, upon the user 110 pressing and holding the exemplary reset button 310 for three seconds, the hour digit(s) will blink, indicating that the hour can be changed. The reset button 310 can then be pressed repeatedly, as desired, to advance the hour data up from the currently displayed hour to the desired hour. In this time-change mode, the reset button 310 can also be pressed as desired to reduce the hour data from the currently displayed hour to the desired hour. In the exemplary embodiment, if the reset button 310 is not pressed after five seconds, the time will be set and the device 100 will continue to operate in watch mode.

Figure 4:
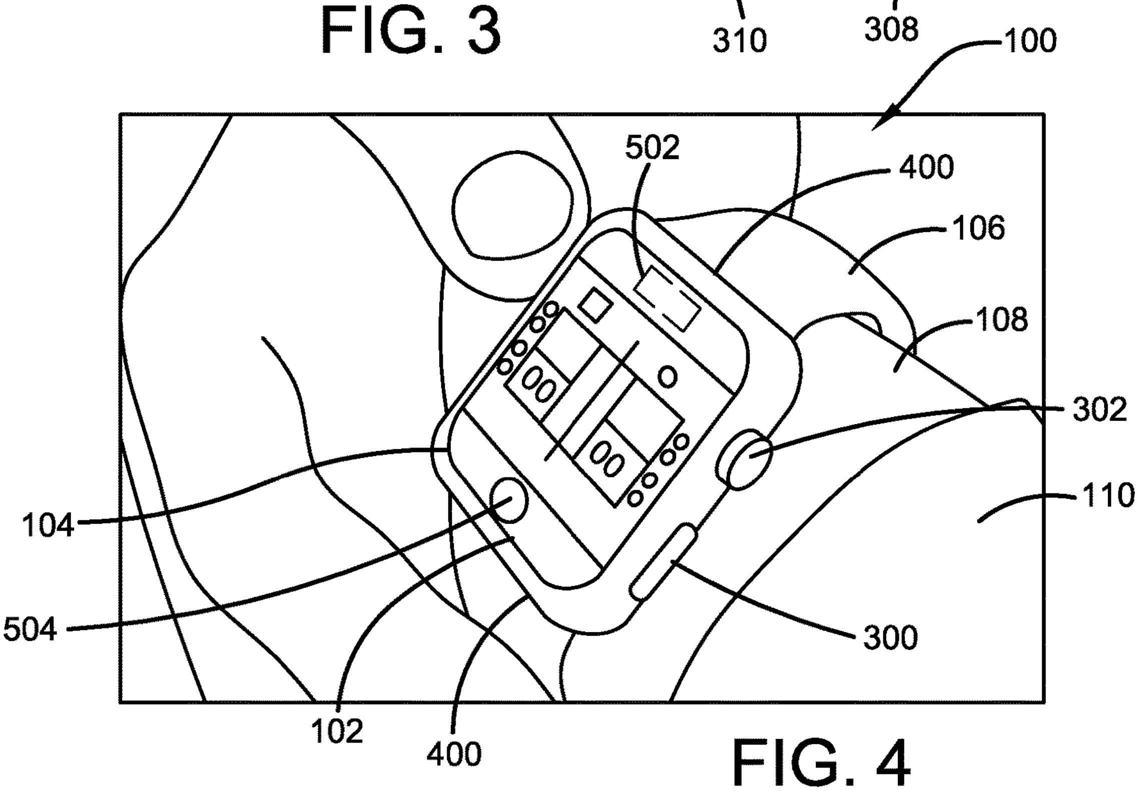
FIG. 4 illustrates a perspective view of one embodiment of the pickleball score wristwatch device of the present invention showing the wrist strap in accordance with the disclosed architecture.

As shown in FIG. 4, the pickleball score wristwatch device 100 comprises a body component 102 and a wrist strap or band 106. The band 106 extends between opposing ends 204 of the body component 102, wherein the ends 400 of the band 106 respectively connect to the opposing ends 204 of the body component 102 via any suitable securing means as is known in the art. In another embodiment, the body component 102 and band 106 can be integrally-formed. "Integrally-formed" refers to the fact that in the exemplary embodiment, the body component 102 and band 106 can be formed together rather than being formed separately and then subsequently joined. Furthermore, the ends 400 of the band 106 are spaced from one another such that the body component 102 and the band 106 cooperate to form a loop operable to receive a body part of a user 110, such as an arm or wrist 108. The band 106 is adjustable and typically made of a rubberized material to provide both flexibility and comfort to the user 110. Specifically, the band 106 has an adjustable strap, such as a buckle, snap, velcro, toggle, etc.

Typically, the exemplary band 106 can be worn on the wrist 108 of a user 110. It is noted that in alternative embodiments of the invention, the device 100 can be worn on the leg or bicep. An alternative embodiment could include a band 106 that can be bifurcated and selectively connected together, like a two-piece watch band. Such an embodiment could be mounted on the back of a pickleball racket. The exemplary embodiment is water-resistant and some embodiments can be waterproof, as well.

Generally, the exemplary band 106 is formed from silicone. Further, the material used to form the band 106 can be infused with negative ion-emitting material to promote the health of the user 110. Pulverized minerals such as germanium, tourmaline, and/or Si Bin can be mixed in with the raw silicone material prior to molding to infuse the band 106 with negative ion energy, or other suitable materials.

Figure 5:
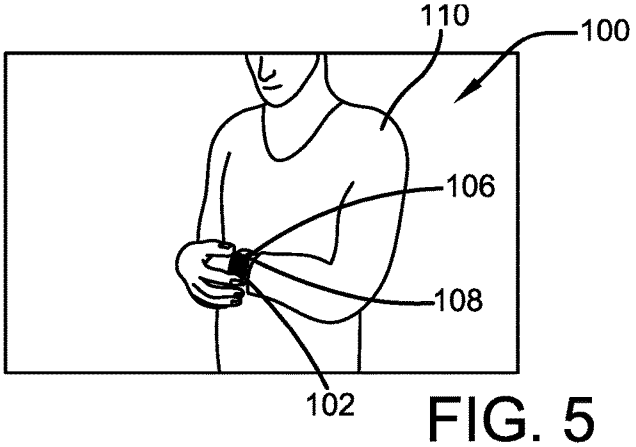
FIG. 5 illustrates a front perspective view of one embodiment of the pickleball score wristwatch device of the present invention in use in accordance with the disclosed architecture.

As shown in FIG. 5, the design of the invention shown in the Figures is intended to minimize interference with various body and arm movements required by gameplay and to permit efficient and time-saving data entry to provide continuous score updating for pickleball matches. While the Figures depict a unified construction embodying the elements of a display screen 104 and multiple data input initiator buttons 300-310, it could easily be separated into two or more of its elements wherein the invention may embody a separate display screen 104 comprising multiple data input initiators, which may be attached to one or more strap elements 106 for affixing to a player's wrist 108. Further, the band 106 and body component 102 could be formed separately and connected together in alternative embodiments of the invention. This feature would allow the band 106 to be replaced for aesthetic reasons or normal wear and tear.

In yet another embodiment, the pickleball score wristwatch device 100 comprises a plurality of indicia 500. The body component 102 of the device 100 may include advertising, a trademark, or other letters, designs, or characters, printed, painted, stamped, or integrated into the body component 102, or any other indicia 500 as is known in the art. Specifically, any suitable indicia 500 as is known in the art can be included, such as, but not limited to, patterns, logos, emblems, images, symbols, designs, letters, words, characters, animals, advertisements, brands, etc., that may or may not be pickleball, scorekeeping, or brand related.

In one embodiment, the processor 216, the display screen 104, and other electrically-powered components of the device 100 can be powered by a battery 502 operable to supply direct current. Such a battery 502 could be rechargeable. In alternative embodiments, a solar panel could be incorporated to provide power.

The battery 502 may be a disposable battery or a rechargeable battery in the form of an alkaline, nickel-cadmium, nickel-metal hydride battery, etc., such as any 3V-12 volts DC battery or other conventional battery, such as A, AA, AAA, etc., that supplies power to the pickleball score wristwatch device 100. Throughout this specification, the term "battery" may be used interchangeably to refer to one or more wet or dry cells or batteries of cells in which chemical energy is converted into electricity and used as a source of DC power. References to recharging or replacing the battery 502 may refer to recharging or replacing individual cells, individual batteries of cells, or a package of multiple battery cells as is appropriate for any given battery technology that may be used. In addition, a rechargeable embodiment of the battery 502 may be recharged using a USB port (not shown), wherein the USB port is a USB-A, USB-B, Micro-B, Micro-USB, Mini-USB, or USB-C port, etc.

Furthermore, additional embodiments may be available based on the internal circuitry of the device 100 and additional electronic components. For example, embodiments of the invention can be practiced with display modules 210 that can communicate through the display screen 104 as well as another communication scheme. For example, embodiments of the invention can be operable to communicate through Bluetooth, Wi-Fi, and/or a cellular phone network. Embodiments of the invention may also incorporate a USB port for communication.

In other embodiments of the invention, the display module 210 can also include circuitry 214, programming, a speaker 504, and any other necessary components to generate audible sounds. For example, the display module 210 could be operable to operate in an alarm mode, such that the user 110 could set an audible alarm to go off at a desired time. Such alarms could also be communicated to the user 110 by vibration in other embodiments of the invention.

In other embodiments of the invention, the display module 210 can also include circuitry 214, programming, and any other necessary components to function as a pedometer. Further, the display module 210 can also include circuitry 214, programming, and any other necessary components to function as a heart rate monitor, a global positioning system, a thermostat, an accelerometer, an altimeter, a barometer, and/or a wireless car key, etc.

In other embodiments of the invention, the display module 210 can also include circuitry 214, programming, and any other necessary components, such that the device 100 functions as an app on an Apple watch or Samsung device instead of a standalone wristwatch device.

Figure 7:
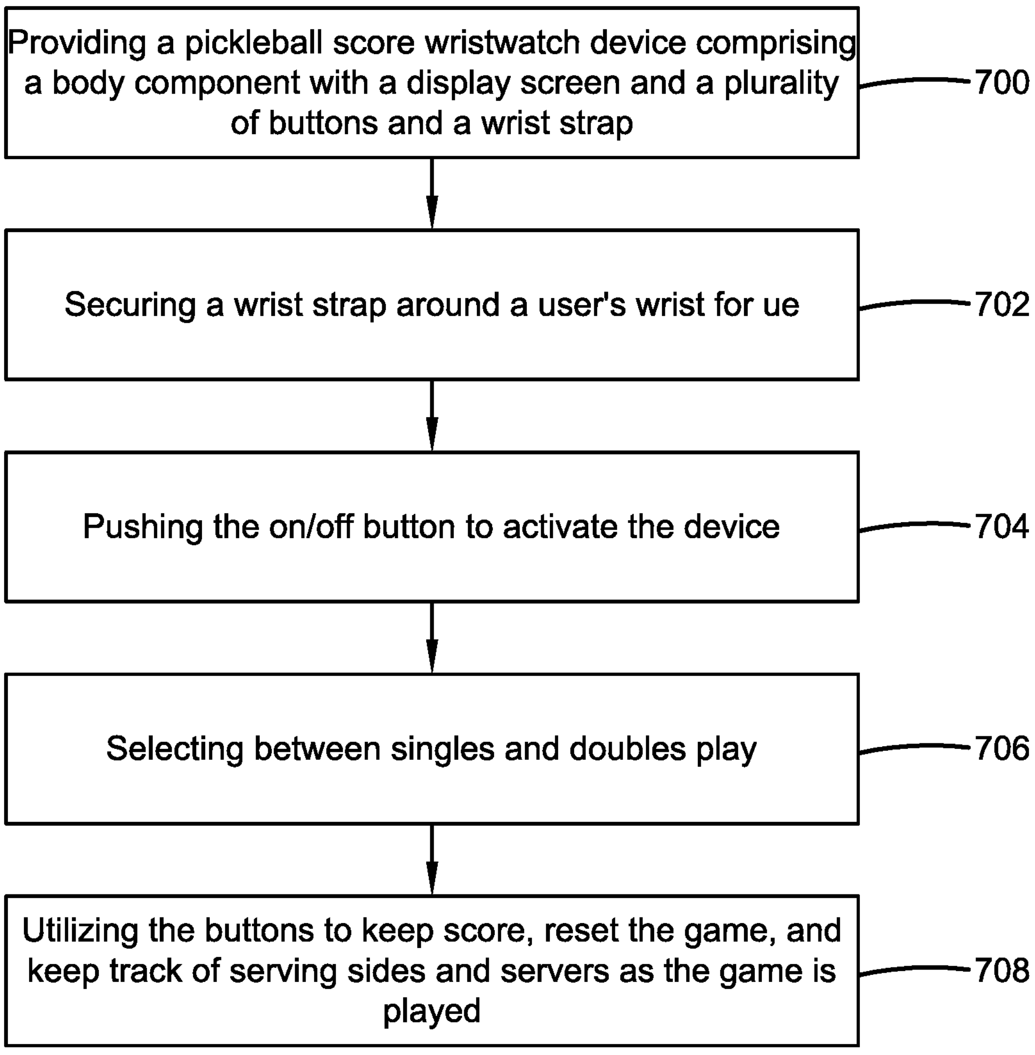
FIG. 7 illustrates a flowchart showing the method of keeping track of scores, serving sides, and servers, in a pickleball game in accordance with the disclosed architecture.

FIG. 7 illustrates a flowchart of the method of keeping track of scores, serving sides, and servers, in a pickleball game. The method includes the steps of at 700, providing a pickleball score wristwatch device comprising a body component with a display screen and a plurality of buttons, and a wrist strap. The method also comprises at 702, securing the wrist strap around a user's wrist for use. Further, the method comprises at 704, pushing the on/off button to activate the device. The method also comprises at 706, selecting between singles and doubles play. Finally, the method comprises at 708, utilizing the buttons to keep score, reset the game, and keep track of serving sides and servers as the game is played.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "pickleball score wristwatch device", "pickleball score device", "pickleball wristwatch device", and "device" are interchangeable and refer to the pickleball score wristwatch device 100 of the present invention.

Notwithstanding the foregoing, the pickleball score wristwatch device 100 of the present invention can be of any suitable size and configuration as is known in the art without affecting the overall concept of the invention, provided that it accomplishes the above-stated objectives. One of ordinary skill in the art will appreciate that the pickleball score wristwatch device 100 as shown in FIGS. 1-7 is for illustrative purposes only, and that many other sizes and shapes of the pickleball score wristwatch device 100 are well within the scope of the present disclosure. Although the dimensions of the pickleball score wristwatch device 100 are important design parameters for user convenience, the pickleball score wristwatch device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pickleball score wristwatch device that provides a user with a wristwatch device that keeps tracks of scores, serving sides and servers, the pickleball score wristwatch device comprising:

a body component with a plurality of buttons; and a wrist strap;

wherein the body component comprises a display screen that depicts a pickleball score;

wherein the plurality of buttons provide operation and functionality to the body component to allow a user to track scores, serving sides, and servers of a pickleball match;

wherein the body component is configured in a rectangular configuration comprising a front surface, a bottom surface, opposing top and bottom ends, and opposing right and left sides;

wherein the body component comprises a display module with a display screen, positioned on the front surface and the plurality of buttons;

wherein the display screen is an LCD screen and is operable to generate a display of a pickleball court and the score of the pickleball match; and further wherein the wrist strap wraps around a user's wrist to secure the body component to the user's wrist during use.

2. The pickleball score wristwatch device of claim 1, wherein the body component comprises electric circuitry including one or more processors, memory, and input/output components.

3. The pickleball score wristwatch device of claim 2, wherein on the left opposing side of the body component, there are a first button and an on/off button.

4. The pickleball score wristwatch device of claim 3, wherein the first button sets a game for singles or doubles matches, such that a push of the first button sets the game for doubles play, and another push of the first button sets the game to singles play.

5. The pickleball score wristwatch device of claim 4, wherein the on/off button activates and deactivates the body component, as well as controls additional modes of the body component.

6. The pickleball score wristwatch device of claim 5, wherein pressing the on/off button once, allows the body component to power on and enter watch mode to display time, and pressing the on/off button twice, changes mode of operation and the body component now acts in scorekeeper mode as a general scorekeeper for pickleball matches.

7. The pickleball score wristwatch device of claim 6, wherein on the right opposing side of the body component, there is a top button which advances the score in increments of one and a bottom button which reduces the score in increments of one.

8. The pickleball score wristwatch device of claim 7, wherein there are a server change button and a game reset button positioned on the display screen, such that the server change button allows the user to change between server one and two, in doubles play, and the game reset button allows the user to reset the game.

9. The pickleball score wristwatch device of claim 8, wherein when in watch mode, the game reset button can be used to set and reset correct hour of day.

10. The pickleball score wristwatch device of claim 9, wherein ends of the wrist strap extend between opposing top and bottom ends of the body component and are secured, forming a loop operable to receive the user's wrist.

11. A pickleball score wristwatch device that provides a user with a wristwatch device that keeps tracks of scores, serving sides and servers, the pickleball score wristwatch device comprising:

a body component; and a wrist strap;

wherein the body component is configured in a rectangular configuration comprising a front surface, a bottom surface, opposing top and bottom ends, and opposing right and left sides;

wherein the body component comprises a display module with a display screen, positioned on the front surface;

wherein the display screen is an LCD screen and is operable to generate a display of a pickleball court and a score of a pickleball match;

wherein the body component comprises electric circuitry including one or more processors, memory, and input/output components;

wherein on the left opposing side of the body component, there are a first button and an on/off button;

wherein the first button sets a game for singles or doubles matches, such that a push of the first button sets the game for doubles play, and another push of the first button sets the game to singles play;

wherein the on/off button activates and deactivates the body component, as well as controls additional modes of the body component;

wherein on the right opposing side of the body component, there is a top button which advances the score in increments of one and a bottom button which reduces the score in increments of one;

wherein there are a server change button and a game reset button positioned on the display screen, such that the server change button allows the user to change between server one and two, in doubles play, and the game reset button allows the user to reset the game; and further wherein ends of the wrist strap extend between opposing top and bottom ends of the body component and are secured, forming a loop operable to wrap around a user's wrist, during use.

12. The pickleball score wristwatch device of claim 11 wherein the pickleball score wristwatch device functions as an app on an Apple watch or Samsung device instead of a standalone wristwatch device.

13. The pickleball score wristwatch device of claim 11, wherein the display screen and the body component are powered by a battery.

14. The pickleball score wristwatch device of claim 11, wherein the display module can communicate through the display screen and is operable to communicate through Bluetooth, Wi-Fi, or a cellular phone network.

15. The pickleball score wristwatch device of claim 11, wherein the display module comprises a speaker and any other necessary components to generate audible sounds.

16. The pickleball score wristwatch device of claim 11, wherein pressing the on/off button once, allows the body component to power on and enter watch mode to display time, and pressing the on/off button twice, changes mode of operation and the body component now acts in scorekeeper mode as a general scorekeeper for pickleball matches.

* * * * *